United States Patent [19]

Ishikawa

[11] Patent Number: 5,077,797
[45] Date of Patent: Dec. 31, 1991

[54] FM STEREO RECEIVER

[75] Inventor: Tsutomu Ishikawa, Ota, Japan

[73] Assignee: Sanyo Electric Co., Ltd., Osaka, Japan

[21] Appl. No.: 527,742

[22] Filed: May 23, 1990

[30] Foreign Application Priority Data

| May 25, 1989 | [JP] | Japan | 1-132053 |
| May 25, 1989 | [JP] | Japan | 1-132054 |
| Jun. 2, 1989 | [JP] | Japan | 1-141375 |

[51] Int. Cl.⁵ .................. H04H 5/00; H04R 5/00
[52] U.S. Cl. ........................... 381/3; 381/13; 381/18; 381/22
[58] Field of Search ............... 381/1, 3, 22, 13, 18

[56] References Cited

U.S. PATENT DOCUMENTS

| 3,883,692 | 5/1975 | Tsurushima | 381/22 |
| 4,419,541 | 12/1983 | Kishi | 381/13 |
| 4,799,260 | 1/1989 | Mandell et al. | |
| 4,833,715 | 5/1989 | Sakai | 381/13 |
| 4,933,768 | 6/1990 | Ishikawa | 381/18 |

FOREIGN PATENT DOCUMENTS

351835 1/1990 European Pat. Off.
2174275A 10/1986 United Kingdom.

Primary Examiner—Jin F. Ng
Assistant Examiner—Jack Chiang
Attorney, Agent, or Firm—Darby & Darby

[57] ABSTRACT

An FM stereo receiver for receiving FM stereo broadcast signals includes a pro-logic surround system in which the left stereo signal, a right stereo signal, a stereo sum signal and a stereo difference signal are selectively emphasized. Also includes a noise signal detector for detecting the noise signal in the received signal, and a device for disabling the pro-logic surround system when the noise signal is detected.

13 Claims, 8 Drawing Sheets

FM STEREO RECEIVER

BACKGROUND OF THE INVENTION

1. Field of the Invention

The present invention relates to an improvement of an FM stereo receiver, and specifically to an FM stereo receiver which controls the output signal level of the stereo multiplex circuit to cause an apparent improvement in channel separation.

2. Description of the Prior Art

When an FM stereo signal is received, an FM detection circuit is used to detect the FM broadcast signal. Also, a stereo multiplex circuit is used to separate the output signal from the detection circuit into left (L) and right (R) stereo signals which are amplified by a low frequency amplifier and then applied to the left and right speakers. In addition, three channel and four channel systems have also been proposed. In the conventional three channel system, a stereo sum signal (L+R) either contained in the FM detected output signal or generated by adding the separated left and right stereo signals is applied to a center speaker. In the four channel system the center speaker is further complemented by a rear speaker to which is applied a stereo difference signal (L−R) either contained in the FM detected output signal or generated by subtracting the separated left and right stereo signals. By thus increasing the audio channels, sound source position and direction can be improved.

However, simply increasing the audio channels as thus described is not enough, and systems which further enhance the stereo effect have been desired.

SUMMARY OF THE INVENTION

The present invention has been developed with a view to substantially solving the above described disadvantages and has for its essential object to provide an improved FM stereo receiver.

In order to achieve the aforementioned object, the present invention is characterized by a first comparison circuit which generates a first control signal based on the ratio between the left and right stereo signal, a second comparison circuit which generates a second control signal based on the ratio between the stereo sum and difference signals, a level control circuit which controls the output signal level of the stereo multiplex circuit using said first and second control signals, a noise detection circuit which detects noise in the received signal, and a means of changing the dynamic range of at least the second comparison circuit according to the output signal of the noise detection circuit.

An FM stereo receiver according to the present invention can determine which of the left and right stereo signals and the stereo sum and difference signals is dominant using the first and second control signals obtained from the first and second comparison circuits. By then controlling the output signal level of the stereo multiplex circuit based on this result, a signal with emphasized orientation can be applied to the left, right, center, and rear speakers. Moreover, because noise in the received signal is detected to change the dynamic range of at least the second comparison circuit, erroneous directional emphasis caused by said noise can be prevented.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
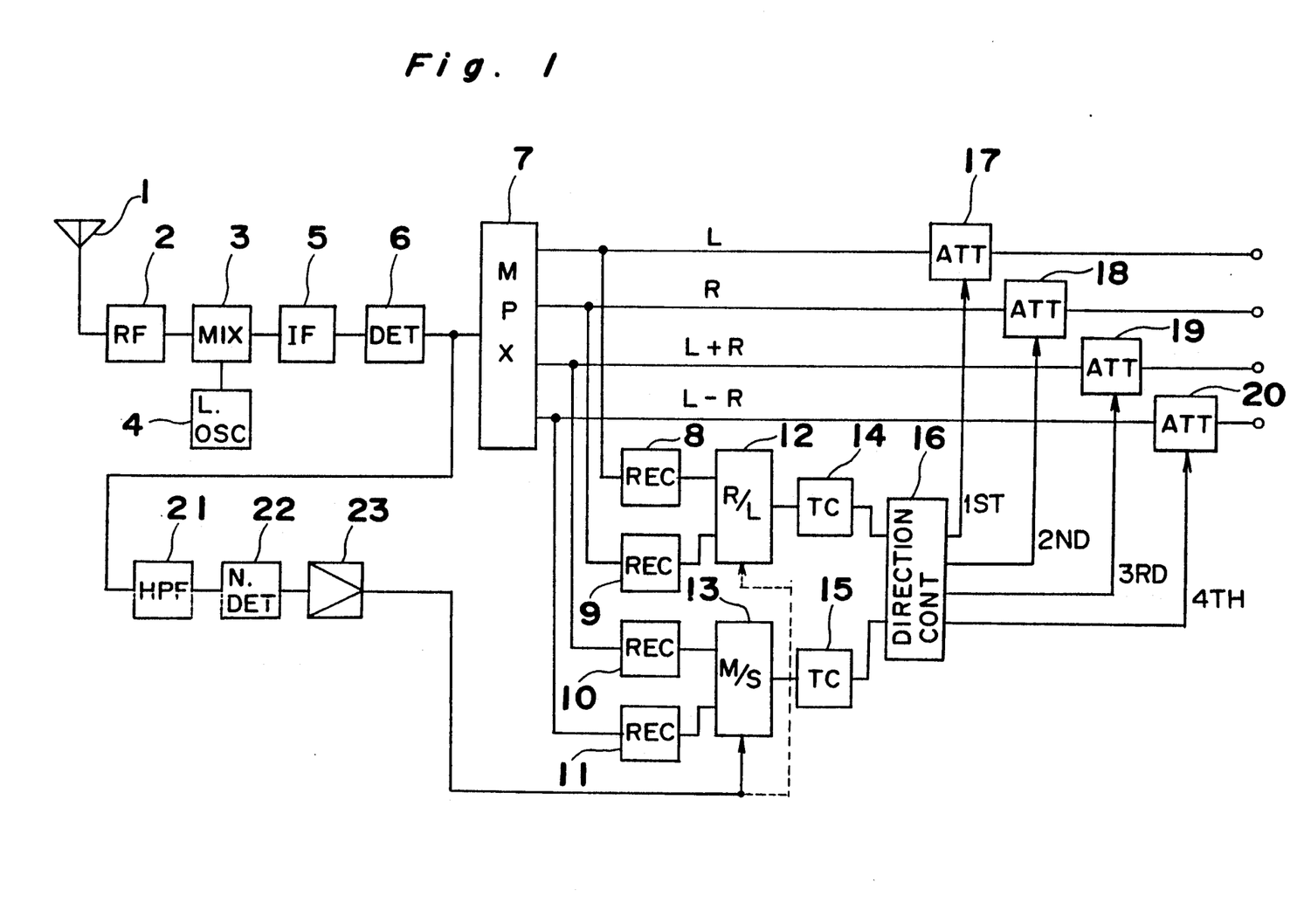
FIG. 1 is a block diagram of an FM stereo receiver according to a first embodiment of the present invention.

Referring to FIG. 1, a block diagram of the FM stereo receiver according to the first embodiment of the present invention is shown. In FIG. 1, reference number 1 is the antenna through which is received the FM stereo broadcast signal; 2 is the RF amplifier which amplifies the RF signal received by the antenna 1; 3 is the mixing circuit which mixes the amplified RF signal and the output signal of the local oscillator 4 to generate the IF signal; 5 is the IF amplifier which amplifies the IF signal; 6 is 10 the FM signal detector which detects the amplified IF signal; and 7 is the stereo multiplexer which separates the left and right stereo signals (L) and (R) from the stereo sum signal (L+R) and stereo difference signal (L−R) contained in the output signal from FM signal detector 6. The stereo sum signal (L+R) is also referred to as a main signal (M) and the stereo difference signal (L−R) is also referred to as a sub-signal (S).

Still referring to FIG. 1, reference numbers 8 through 11 are first through fourth rectifiers which rectify the respective output signals of the stereo multiplexer 7; 12 is a first comparison circuit which calculates a ratio (R/L) of the levels of the signals produced from the first and second rectifiers 8 and 9; 13 is a second comparison circuit which calculates a ratio (M/S) of the levels of the signals produced from the third and fourth rectifiers 10 and 11; 14 and 15 are first and second time constant circuits connected to the output terminals of the first and second comparison circuits 12, 13, respectively; 16 is a directional controller which generates first through fourth output signals based on the output signals of the first and second time constant circuits 14 and 15; and 17 through 20 are first through fourth attenuators which attenuate the output signals of the stereo multiplexer 7 based on the first through fourth output signals of the directional controller 16.

Furthermore, reference number 21 is a high pass filter which passes high frequency noise in the detected output signal; and 22 is a noise detector which detects the high frequency noise and generates a control signal which is outputted through a buffer amplifier 23 to control the dynamic range of the second comparison circuit 13.

It is to be noted that the directional controller 16 and first through fourth attenuators 17-20 define a level control circuit.

In operation, the FM stereo signal received at the antenna 1 is RF amplified, converted to an IF signal, and FM detected as in known FM stereo receiver. By the stereo multiplexer 7, the left and right stereo signals (L) and (R) are separated from the stereo sum signal (L+R) and the stereo difference signal (L−R) contained in the output signal of the FM signal detector 6. It is thus possible to produce left and right stereo signals (L) and (R), stereo sum signal (L+R), and stereo difference signal (L−R) at the output terminals of the stereo multiplexer 7. The signals obtained at the output terminal of the stereo multiplexer 7 are rectified by the first through fourth rectifiers 8-11, and are applied to the first comparison circuit 12 and the second comparison circuit 13, respectively. An output signal corresponding to the level ratio of the left and right stereo signals (L) and (R) is generated by the first comparison circuit 12, and an output signal corresponding to the level ratio of the stereo sum and difference signals (L+R), (L−R) is generated by the second comparison circuit 13. A detailed description of the first and second comparison circuits 12 and 13 is provided for example in U.S. patent application Ser. No. 381,922 which is assigned to the same assignee as the present application, or in European Patent publication EP 351,835 published Jan. 24, 1990.

The first and second output control signals from the first and second comparison circuits 12 and 13 are applied through the first and second time constant circuits 14 and 15, respectively, and in turn applied to the directional controller 16.

Depending on the output signals from comparison circuits 12 and 13, directional controller 16 carries out a predetermined logic to generate first through fourth output signals. The first through fourth output signals from directional controller 16 are used for controlling the first through fourth attenuators 17, 18, 19 and 20.

Figure 3A:
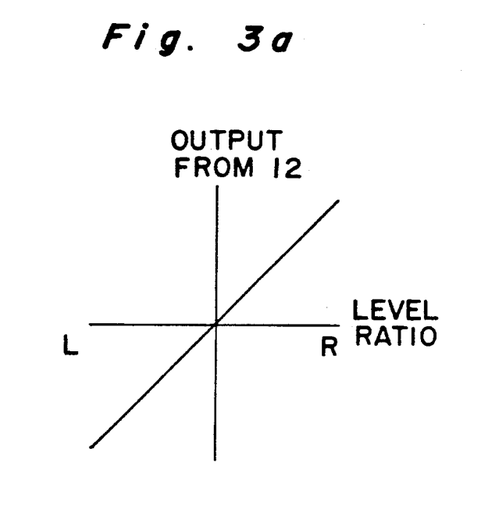
FIGS. 3a and 3b are characteristics diagrams showing outputs obtained from circuits 12 and 13 shown in FIG. 1.
Figure 3B:
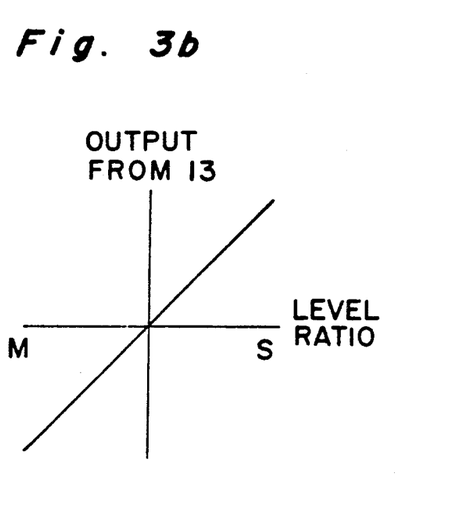

For example, if the first and second output control signals from the first and second comparison circuits 12 and 13 indicate that the left stereo signal (L) is dominant, the directional controller 16 produces a low level signal for the first output signal, and at the same time, high level signals for the second, third and fourth output signals. Accordingly, attenuator 17 inserted in a line for sending the left stereo signal (L) is not activated, but other attenuators 18, 19 and 20 inserted in lines for sending the right stereo signal (R), stereo sum signal (L+R), and stereo difference signal (L−R) are activated so that these signals (R), (L+R) and (L−R) will be attenuated a specific amount, thereby emphasizing the left stereo signal (L). Note that the output signals of the first and second comparison circuits 12, 13 vary linearly as shown in FIGS. 3a and 3b according to the level ratio of the left and right stereo signals (L) and (R) or the level ratio of the stereo sum signal (L+R) and the stereo difference signal (L−R). When the level ratio becomes positive or negative, it is detected in the directional controller 16 that the sound from a certain direction should be emphasized. A detail of the directional controller 16 is disclosed, for example, in U.S. Pat. No. 4,799,260 issued Jan. 17, 1989 or in GB A1 2,174,275 published Oct. 29, 1986.

When there is very little or no noise signal in the received signal, the noise detector 22 which compares the noise signal in the received signal with a predetermined level, produces a LOW level signal which is in turn generated by buffer amplifier 23. The LOW level output signal from buffer amplifier 23 is applied to second comparison circuit 13. In this case, the second comparison circuit 13 operates normally.

However, when the noise signal in the received signal increases due, for example, to multipath noise, the noise level contained in the output signal of the FM signal detector 6 also increases. This noise signal is detected by the noise detector 22, and the output signal from the buffer amplifier 23 has a level corresponding to the detected noise level. When the output signal of the buffer amplifier 23 is applied to the second comparison circuit 13, the dynamic range of the second comparison circuit 13 is reduced.

In other words, as the noise signal in the detected signal produced from detector 6 increases, the noise signal in the output signal of the stereo multiplexer 7 increases. Accordingly, the output signal from multiplexer 7 is rectified and applied to the second comparison circuit 13. If the noise detection circuit 21, 22 and 23 of the present invention is not provided, the second comparison circuit 13 carries out the dominant signal detection based on the noise signal. Accordingly, the noise signal will be emphasized. Thus, without the noise detection circuit 21, 22 and 23, the correct directional emphasis can not be carried out.

According to the present invention, since the noise detection circuit 21, 22 and 23 is provided, even if the noise signal increases, the dynamic range of the second comparison circuit 13 is varied using the output signal of the buffer amplifier 23. Thus, the noise signal can be set aside from the dynamic range, and thus it is possible to prevent adverse effects from the noise signal during directional emphasis.

According to the embodiment shown in FIG. 1, since the stereo difference signal (L−R) occupies a relatively high frequency region in the FM stereo signal spectrum resulting in such that the stereo difference signal (L−R) is easily affected by the noise signal resulting from multipath interference, only the second comparison circuit 13 is coupled with the noise detection circuit 21, 22 and 23. Thus, the result of the noise detection is used only for varying the dynamic range of the second comparison circuit 13. However, it is possible to further connect the output of the buffer amplifier 23 with the first comparison circuit 12, as indicated by a dotted line. In such a case, the output signal of the buffer amplifier 23 may also be used to simultaneously vary the dynamic range of the first comparison circuit 12.

Figure 2:
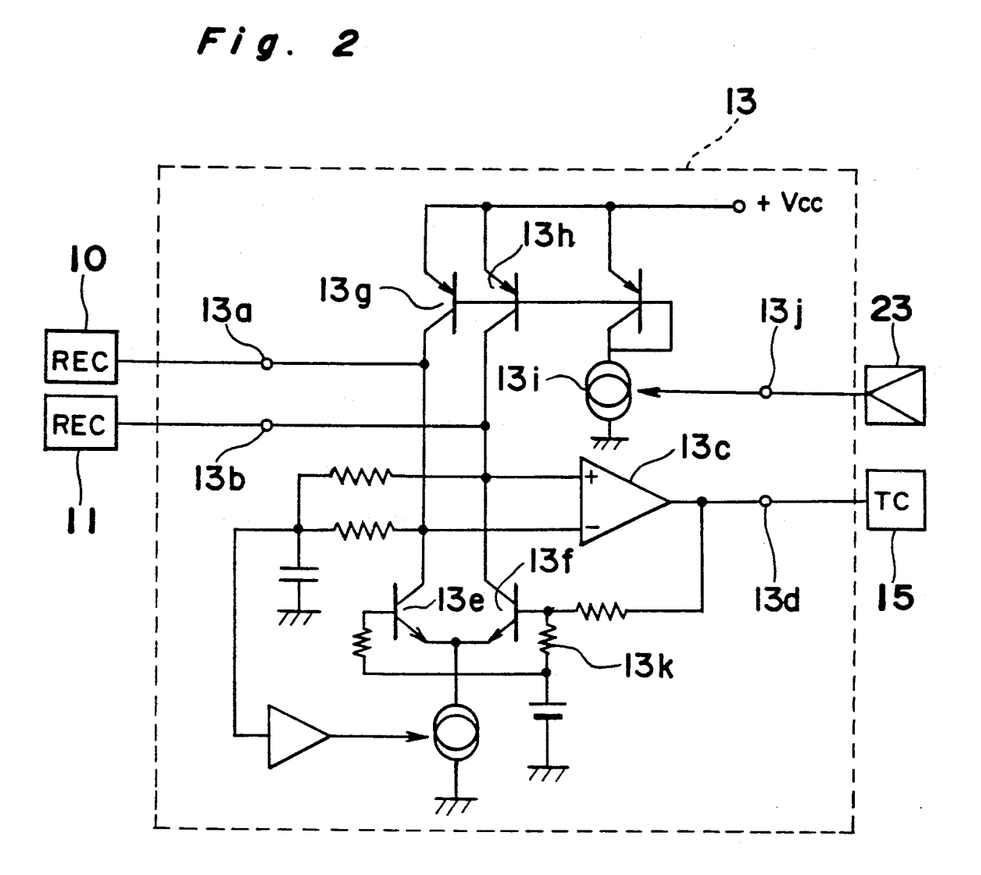
FIG. 2 is a circuit diagram of the second comparison circuit 13 shown in FIG. 1.

Referring to FIG. 2, a sample circuit composing the second comparison circuit 13 is shown, in which the output signal of the third rectifier 10 is applied to the first input terminal 13a, the output signal of the fourth rectifier 11 is applied to the second input terminal 13b, and an output signal corresponding to the level ratio of the stereo sum and difference signals (L+R)/(L−R) is generated at the output terminal 13d connected to the output side of the comparator 13c. Furthermore, collectors of third and fourth transistors 13g and 13h composing the current mirror circuit are connected to the collectors of the differentially connected first and second transistors 13e and 13f. Accordingly, the collector current of the third and fourth transistors 13g and 13h is determined according to the current flowing to the current source 13i. When the current flowing to the current source 13i varies and is set to a specified level, it is possible to assure a dynamic range with sufficient breadth, and also to prevent the generation of unwanted output signals when there is no input.

More specifically, when there is little noise in the output signal of the FM signal detector 6, the output of the buffer amplifier 23 is LOW and thus no control signal is applied to the control terminal 13j. In this case, the current flowing to the current source 13i is maintained at a relatively low specified level. When the noise in the output signal of the FM signal detector 6 increases, the output signal level of the buffer amplifier 23 applied to the control terminal 13j increases. Accordingly, the current flowing to the current source 13i increases. Thus, the collector current of the third and fourth transistors 13g and 13h increases, resulting in the decrease of the dynamic range of the circuit shown in FIG. 2. Thus, the operational errors caused by the noise signal can be prevented.

Figure 4:
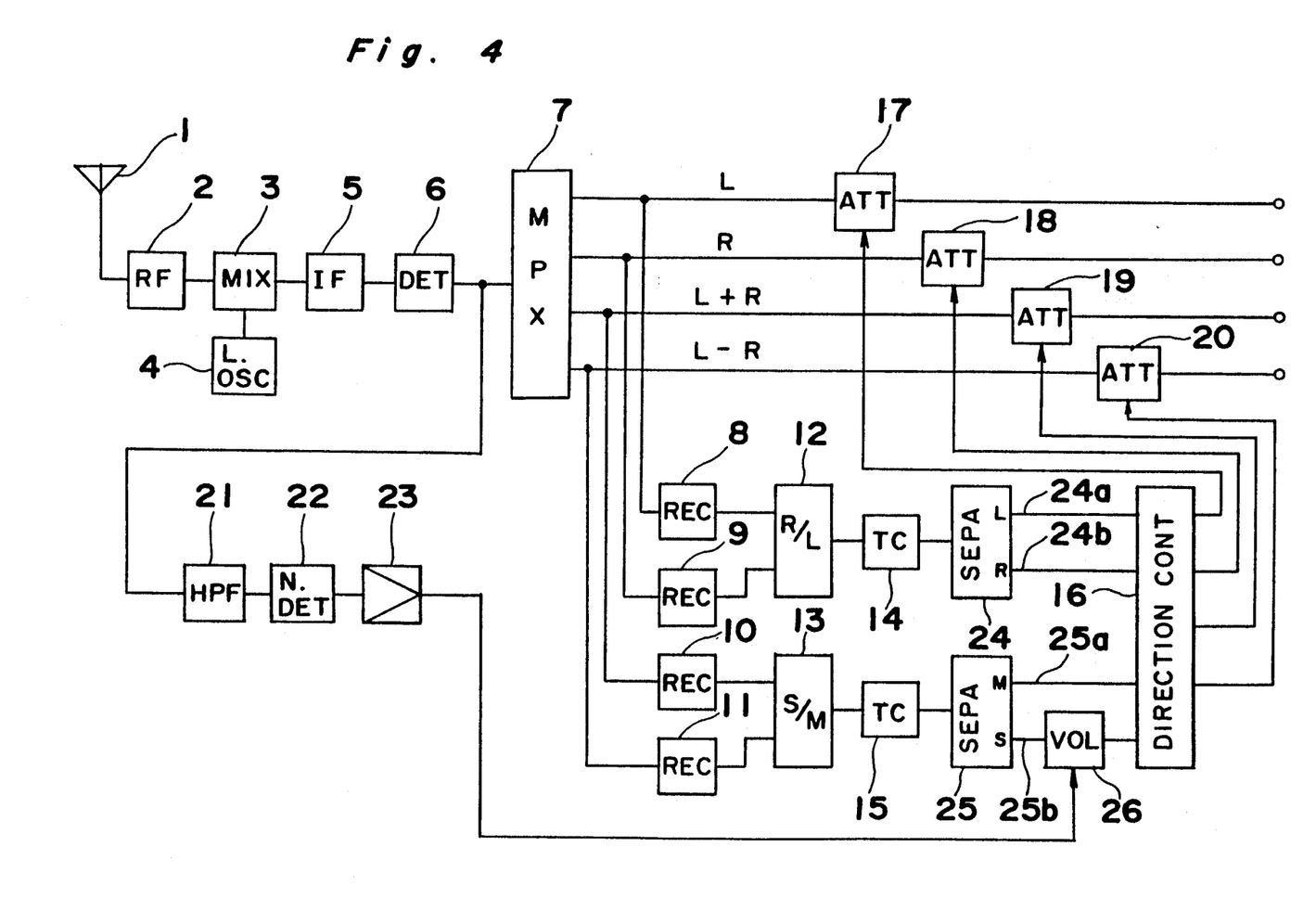
FIG. 4 is a block diagram of a second embodiment of the present invention.

Referring to FIG. 4, a block diagram of the FM stereo receiver according to a second embodiment of the present invention is shown. When compared with the first embodiment shown in FIG. 1, the second embodiment further has first and second separation circuits 24 and 25 and a provisional level control circuit 26. The first separation circuit 24 separates the output signal of the first time constant circuit 14 into the dominant left signal 24a and the dominant right signal 24b which are applied to directional controller 16. Similarly, the second separation circuit 25 separates the output signal of the second time constant circuit 15 into the dominant sum signal 25a and the dominant difference signal 25b. The sum signal 25a is applied to the directional controller 16, but the difference signal 25b is applied to the directional controller 16 through the provisional level control circuit 26. In the second embodiment, the output of the buffer amplifier 23 is connected to the provisional level control circuit 26 which controls the level of the output dominant difference signal of the second separation circuit 25 according to the output signal of the noise detection circuit 21, 22 and 23.

In operation, the first and second output control signals from the first and second comparison circuits 12 and 13 are applied through the first and second time constant circuits 14 and 15, respectively, to the first and second separation circuits 24 and 25. The first separation circuit 24 separates the first control signal into the dominant left signal 24a and the dominant right signal 24b, and the second separation circuit 25 separates the second control signal into the dominant sum signal 25a and the dominant difference signal 25b. FIGS. 6a, 6b, 6c and 6d show the separated results, i.e., the dominant left signal, dominant right signal, dominant sum signal, and dominant difference signal, respectively. The output signals of the first and second separation circuits 24 and 25 are applied to the directional controller 16, so that one of the output signals from the stereo multiplexer 7 is emphasized in a similar manner described above.

For example, if only the dominant left signal is generated in the output signals of the first and second separation circuits 24 and 25, the right stereo signal (R), stereo sum signal (L+R), and stereo difference signal (L−R) will be attenuated by a specific level according to the second, third and fourth output signals from the directional controller 16, thus emphasizing the left stereo signal (L).

When there is little noise in the received signal, a LOW level output signal is generated from the buffer amplifier 23. In this case, the provisional level control circuit 26, to which this LOW level output signal is applied, is so set as to present an amplifier with a gain equal to one. Thus, the output dominant difference signal 25b from the second separation circuit 25 is applied to the directional controller 16 with no substantial change.

However, when noise in the received signal increases to increase the output level from the noise detection circuit 21, 22 and 23, the provisional level control circuit 26 is so set as to present an amplifier with a gain less than one. Thus, the output dominant difference signal 25b from the second separation circuit 25 is applied to the directional controller 16 with reduced level relative to the detected noise level.

In other words, when the noise signal caused particularly by the multipath interference increases, the output dominant difference signal of the second separation circuit 25 increases relative to such noise signal due to the fact that the stereo difference signal (L−R) occupies a relatively high frequency region in the FM stereo signal spectrum. Thus, without the provisional level control circuit 26, it is not possible to obtain correct directional emphasis.

According to the second embodiment shown in FIG. 4, since the provisional level control circuit 26 is inserted in a line for the dominant difference signal 25b, it is possible to prevent supply of a erroneous dominant difference signal caused by such noise to the directional controller 16.

The provisional level control circuit 26 may be arranged in such a manner that its output characteristics varies linearly when the output signal from the noise detection circuit 21, 22 and 23 is LOW level. When the output signal from the noise detection circuit 21, 22 and 23 increases, the provisional level control circuit 26 reduces its gain to a predetermined gain less than one, such as indicated by a single-dot/dash line shown in FIG. 6d, or alternatively, reduces its gain relatively to the increase of the noise level, as indicated by a double-dot/dash line in FIG. 6d. When the output 25b is varied in a manner shown in FIG. 6d, it becomes more difficult to reach the threshold TH1 (FIG. 3b) as the noise level becomes greater. Thus the adverse effects of noise can be avoided. Two examples of the provisional level control circuit 26 are shown in FIGS. 5b and 5c.

Figure 5A:
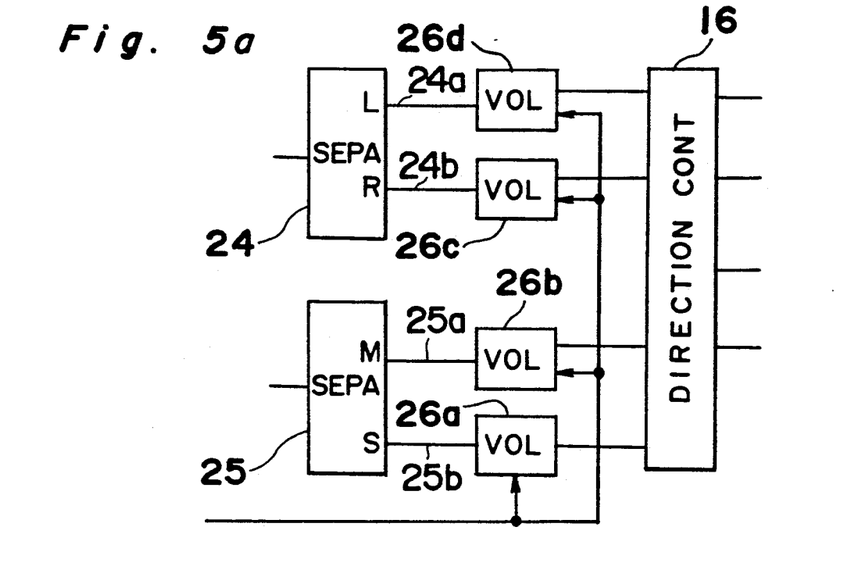
FIG. 5a is a block diagram showing a modification of the second embodiment.
Figures 5B, 5C:
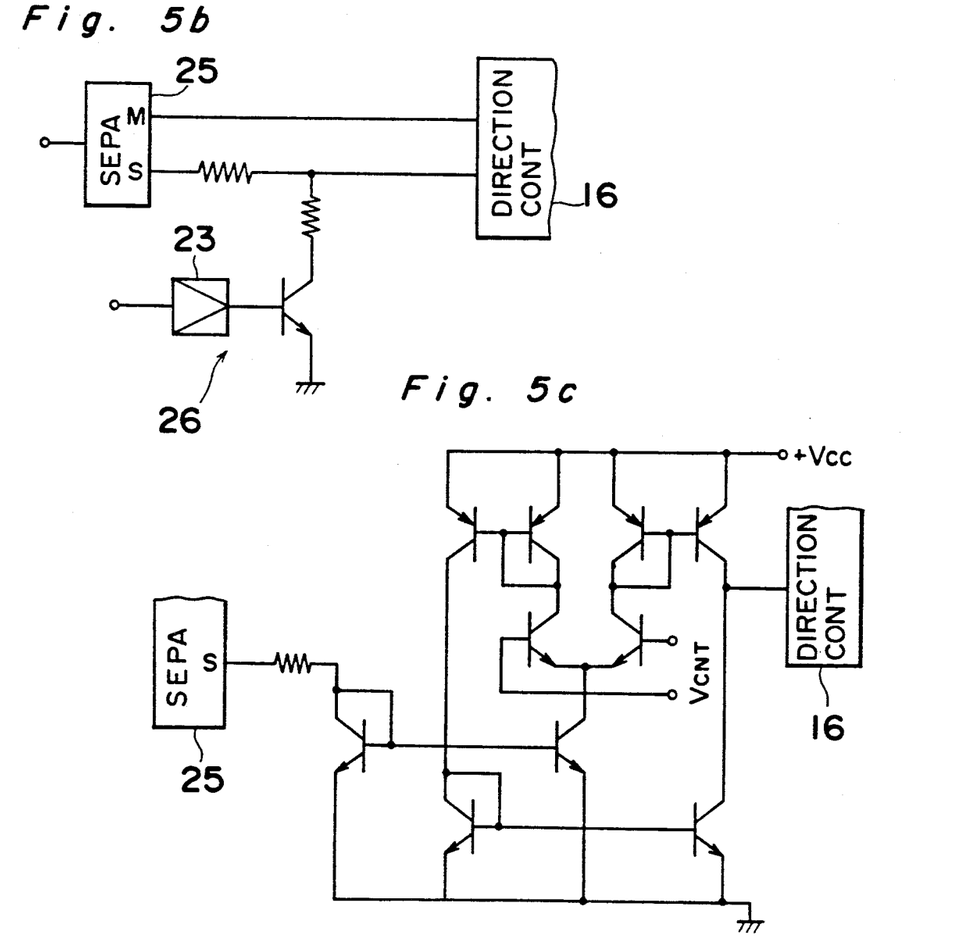
FIG. 5b is a circuit diagram of the provisional level control 26 shown in FIG. 4.
FIG. 5c is a circuit diagram of another example of the provisional level control 26 shown in FIG. 4.
Figure 6A:
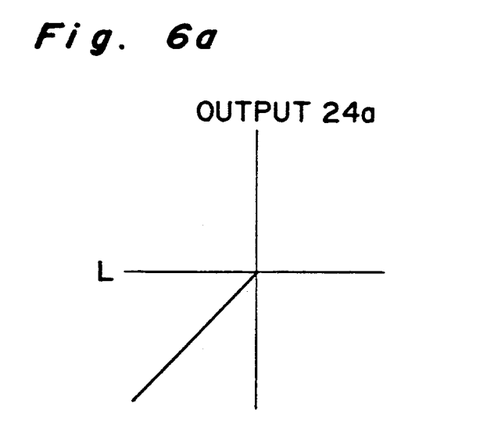
FIGS. 6a to 6d are characteristics diagrams showing outputs obtained from separation circuits 24 and 25 shown in FIG. 4.
Figure 6B:
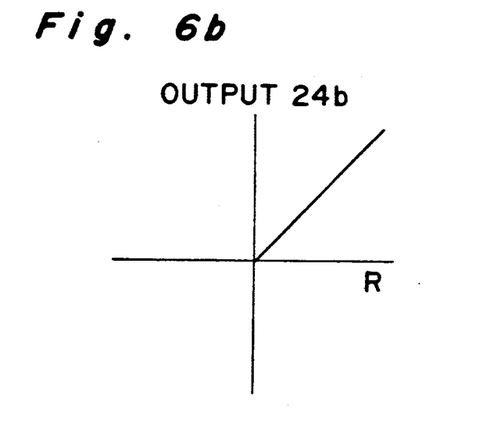
Figure 6C:
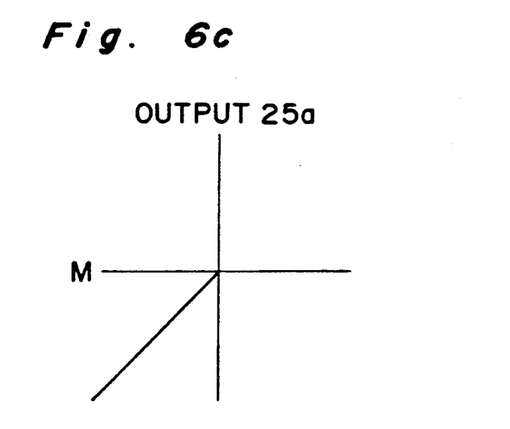
Figure 6D:
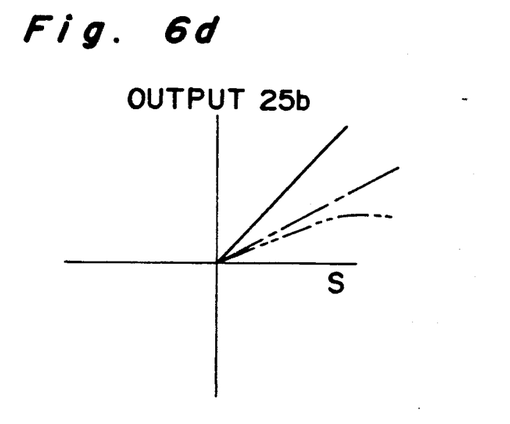

In FIG. 5b, the provisional level control 26 includes a transistor. When the signal produced from buffer amplifier 23 and applied to the base of the transistor varies linearly from low to high relatively to the increase of the detected noise signal, the conductivity of the transistor changes linearly. In this case, the transistor serves as a variable resistor which changes the resistance in accordance with the detected noise signal level. On the other hand, when the signal applied to the base of the transistor varies in a step between high and low levels, the transistor serves as a switch for turning on and off in accordance with the presence and absence of the noise signal.

In FIG. 5c, the provisional level control 26 is defined by a voltage control amplifier. When the signal from the buffer amplifier 23 is applied to $V_{CNT}$, the gain of the voltage control amplifier changes relatively to the level of the signal produced from buffer amplifier 23. Thus, the dominant difference signal 25b as produced from the separation circuit 25 is provisionally attenuated by the gain change of the voltage control amplifier.

It is to be noted that noise generated in the presence of multipath interference significantly affects the stereo difference signal (L−R), but it also effects the left and right stereo signals (L) and (R) and the stereo sum signal (L+R). Thus, the provisional level control circuit may also be inserted to the output signal paths of each of the outputs from the first and second separation circuits 24 and 25, as shown in FIG. 5.

Figure 7:
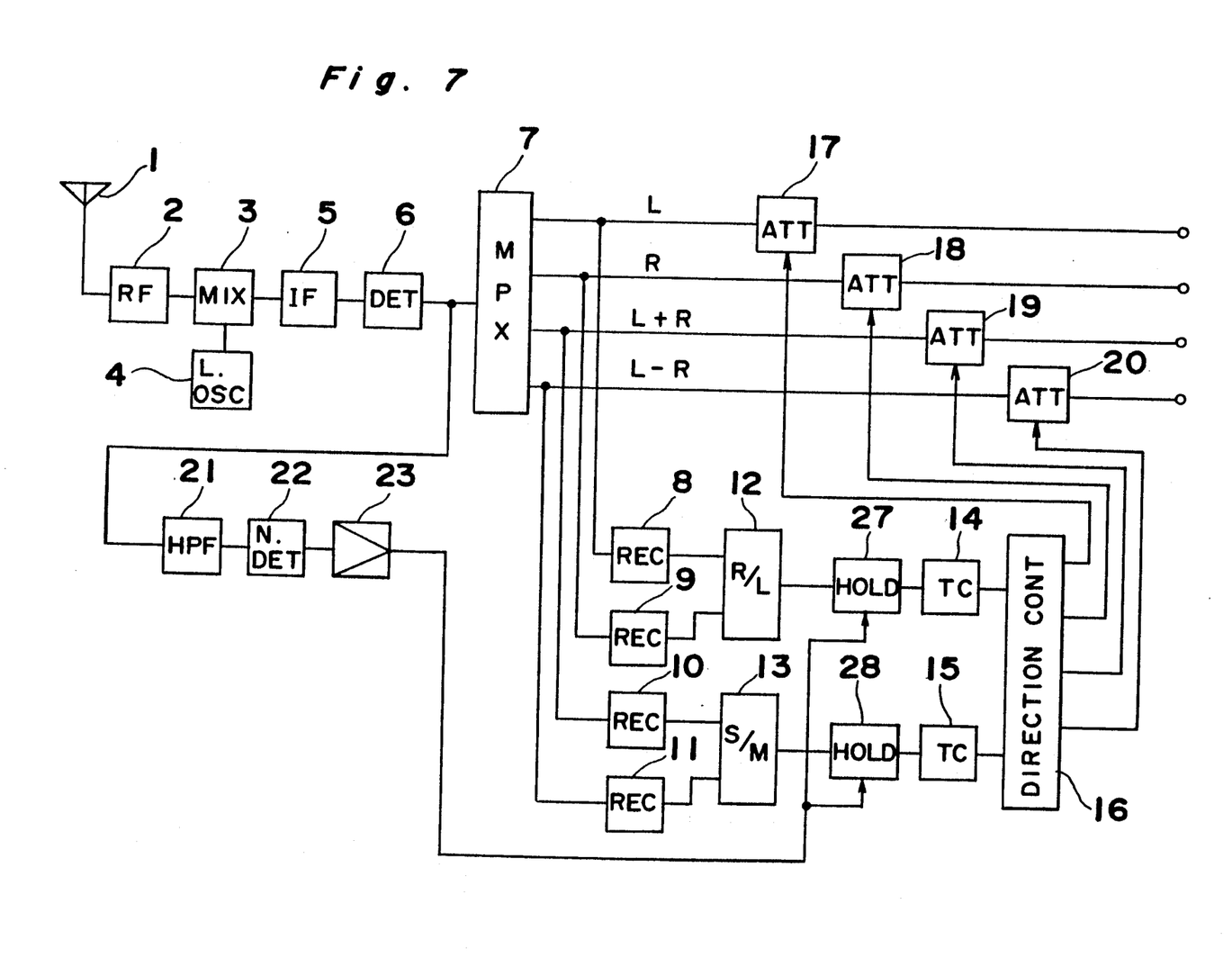
FIG. 7 is a block diagram of a third embodiment of the present invention.

Referring to FIG. 7, a block diagram of the FM stereo receiver according to a third embodiment of the present invention is shown. When compared with the first embodiment shown in FIG. 1, the third embodiment further has first and second holding circuits 27 and 28 which are inserted between first comparison circuit 12 and first time constant circuit 14 and between second comparison circuit 13 and second time constant circuit 15, respectively. Also, the output of the buffer amplifier 23 in this embodiment is connected to each of holding circuits 27 and 28. The first holding circuit 27 holds the output signal of the first comparison circuit 12 according to the output signal of the noise detection circuit 21, 22 and 23, and similarly, the second holding circuit 28 holds the output signal of the second comparison circuit 13 according to the output signal of the noise detection circuit 21, 22 and 23.

In operation, when there is little or no noise signal in the received signal, the noise detection circuit 21, 22 and 23 produces a LOW level signal which is applied to the first and second holding circuits 27 and 28. In this case, the first and second holding circuits 27 and 28 is so operated as to merely pass the signal therethrough without any substantial change. Thus, the output signals of the first and second comparison circuits 12 and 13 are applied directly to the first and second time constant circuits 14 and 15.

However, when noise in the received signal increases, the signal from the noise detection circuit 21, 22 and 23 increases to a HIGH level signal correspondingly to the detected noise. During the increasing of the output signal from the noise detection circuit 21, 22 and 23, the first and second holding circuits 27 and 28 are activated to hold the signal level of the output signals from the first and second comparison circuits 12 and 13 immediately before the noise signal becomes great. The values held in the first and second holding circuits 27 and 28 are applied to the directional controller 16.

Thus, it is possible to prevent the output signal of the first and second comparison circuits 12 and 13 from being applied to the directional controller 16 when the signals from comparison circuits 12 and 13 contain noise signals. Thus, erroneous directional emphasis can be prevented.

Instead of providing two holding circuits 27 and 28, as shown in FIG. 7, it is also possible to provide only one, particularly the second holding circuit 28, at the output terminal of the second comparison circuit 13 so that the signal corresponding to the stereo difference signal (L−R), which is the signal easily affected by noise as described above, is controlled relative to the noise level obtained from the noise detection circuit 21, 22 and 23.

Figure 8:
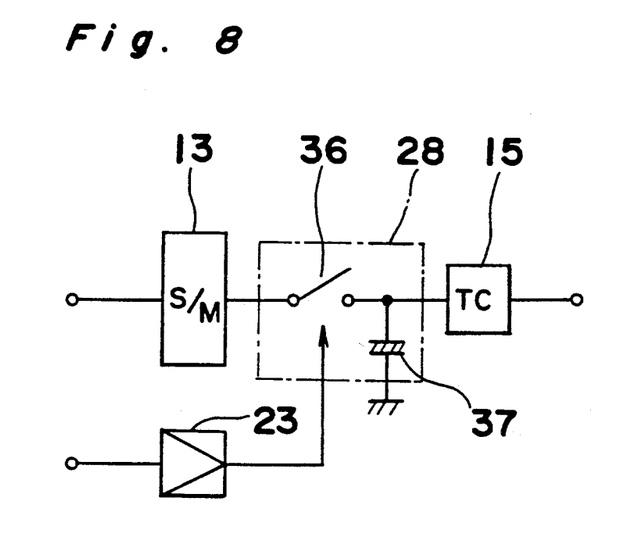
FIG. 8 is a circuit diagram of the holding circuit 28 shown in FIG. 7.

Referring to FIG. 8, an example of the second holding circuit 28 is shown. The second holding circuit 28 comprises a switch 36 which opens and closes according to the output signal of the buffer amplifier 23, and a capacitor 37 which when the switch is open holds the value immediately before the switch opened. Therefore, when noise is not present, the output of the buffer amplifier 23 is LOW, the switch 36 is maintained close. Thus, the output signal of the second comparison circuit 13 is applied to the second time constant circuit 15 through the switch 36 and at the same time the signal level is stored in capacitor 37. When noise is present, the output of the buffer amplifier 23 becomes HIGH, resulting in opening of switch 36. Thus, the input terminal of the second time constant circuit 15 thereafter receives a signal level corresponding to the output signal level of the second comparison circuit 13 immediately before the switch 36 opened. Thus, the signal applied to the directional controller 16 from the second time constant circuit 15 will not be affected by noise signal.

Figure 9:
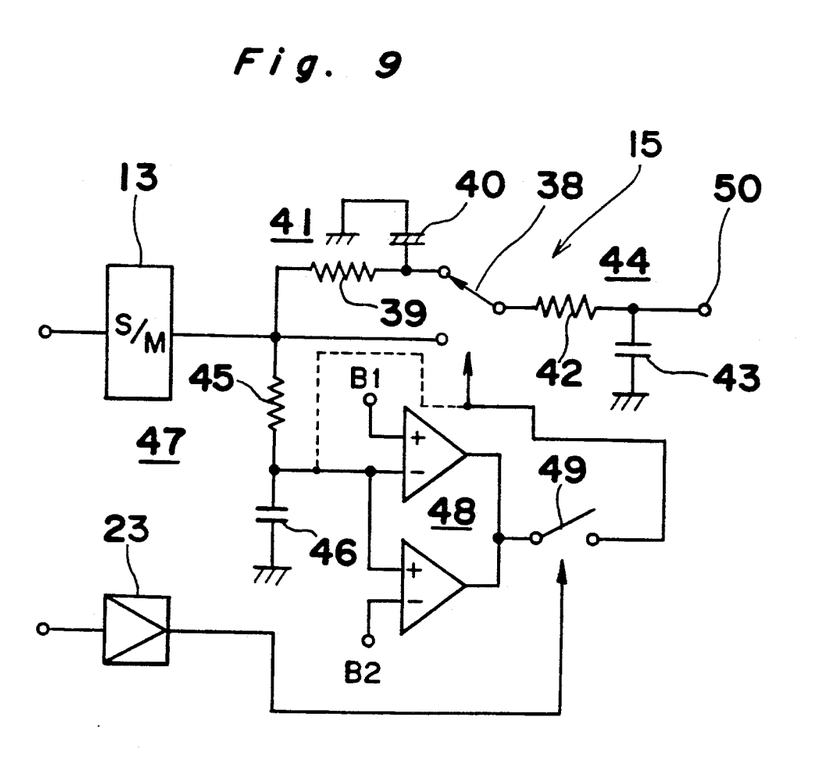
FIG. 9 is a circuit diagram of an alternative arrangement of the holding circuit 28.

Referring to FIG. 9, another example of the second holding circuit 28 is shown wherein the second time constant circuit 15 is improved to function as the second holding circuit 28. The second time constant circuit 15 comprises a first switch 38, a first time constant circuit 41 composed of a first resistance 39 and a first capacitor 40, a second time constant circuit 44 composed of a second resistance 42 and a second capacitor 43, a third time constant circuit 47 composed of a third resistance 45 and a third capacitor 46, a window comparison circuit 48, and a second switch 49 which is switched according to the output of the buffer amplifier 23.

It is to be noted that the first switch 38 is normally in the state as shown in FIG. 9, and switches from this to the other position when a LOW signal is output from the window comparison circuit 48. In addition, the second switch 49 is opened by a HIGH output signal from the buffer amplifier 23.

When there is no noise present, the output of the buffer amplifier 23 is LOW, and the second switch 49 closes. In this state, if the output signal of the second comparison circuit 13 is within the specified range of the reference voltage, the output of the window comparison circuit 48 becomes HIGH, and the first switch 38 is held in the state as shown in FIG. 9. Thus, the output of the second comparison circuit 13 is connected to the output terminal 50 through the first time constant circuit 41 having a high time constant and the second time constant circuit 44 having a low time constant.

When the output signal of the second comparison circuit 13 becomes greater than a first predetermined reference voltage B1, or lower than a second predetermined voltage B2, the output of the window comparison circuit 48 becomes LOW, and the first switch 38 switches to the position opposite that shown in FIG. 9. Thus, the output signal of the second comparison circuit 13 is connected to the output terminal 50 through only the second time constant circuit 44.

When noise occurs, the output of the buffer amplifier 23 becomes HIGH, and the second switch 49 opens. Thus, because the first switch 38 switches to the position shown in FIG. 9, and the output of the second comparison circuit 13 is connected to the output terminal 50 through the first time constant circuit 41 with the high time constant, the output signal of the second comparison circuit 13 is held in capacitor 40. Therefore, according to the circuit shown in FIG. 9, the time constant circuit 15 can be arranged to functional as the holding circuit 28. It is to be noted that the second switch 49 which opens and closes according to the output signal of the buffer amplifier 23 may also be connected to one side of the third capacitor 46 of the third time constant circuit 47, as shown by a dotted line.

Figure 10:
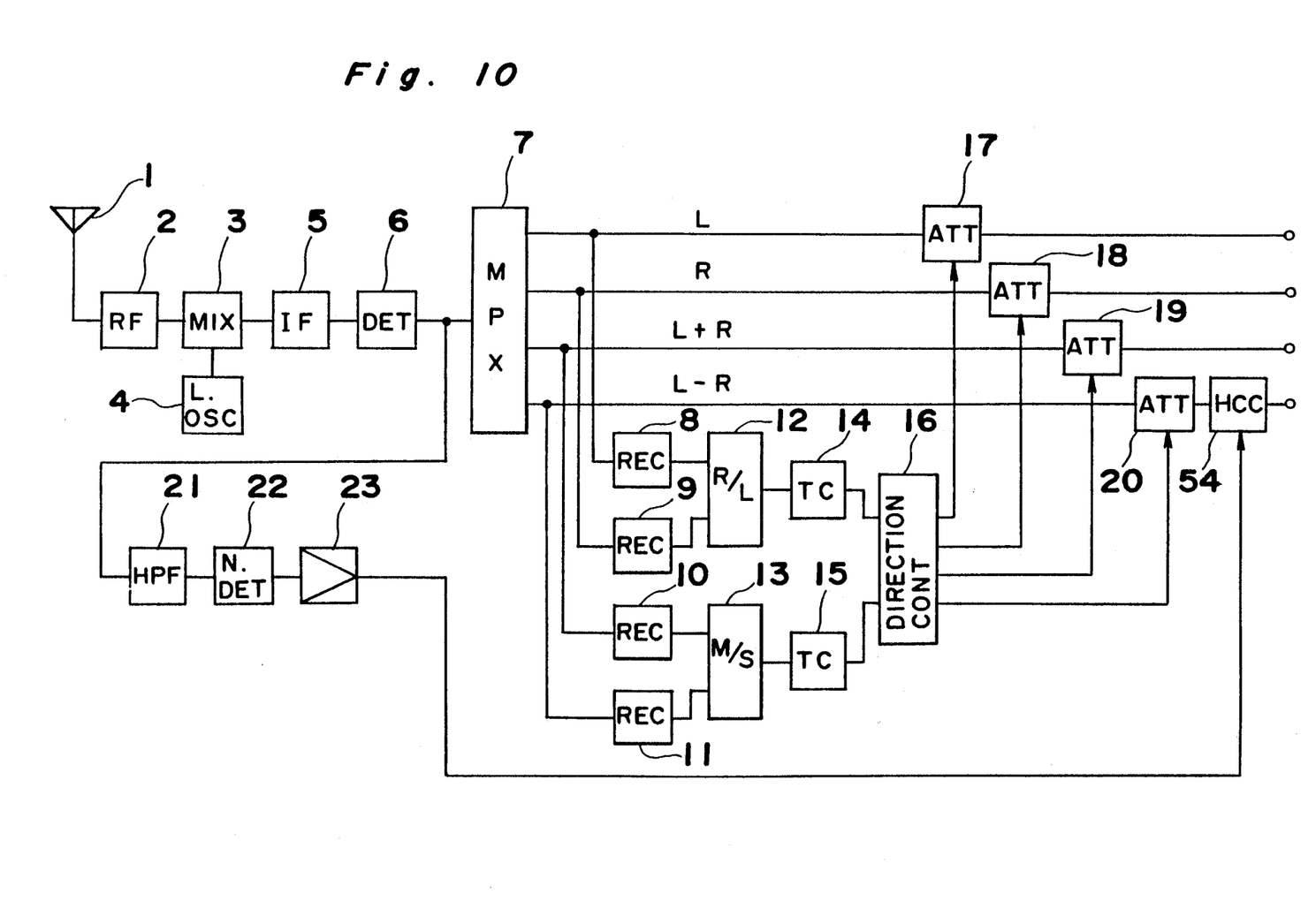
FIG. 10 is a block diagram of a fourth embodiment of the present invention.

Referring to FIG. 10, a block diagram of the FM stereo receiver according to a fourth embodiment of the present invention is shown. When compared with the first embodiment shown in FIG. 1, the fourth embodiment further has a controllable low pass filter 54 connected to the output of attenuator 20. Also, the output of noise detection circuit 21, 22 and 23 is connected to the controllable low pass filter 54 which cuts off the high frequency signal in accordance with the signal obtained from the noise detection circuit 21, 22 and 23.

In operation, when there is little or no noise signal in the received signal, the noise detection circuit 21, 22 and 23 produces a LOW level signal which is applied to the controllable low pass filter 54. In this case, the controllable low pass filter 54 is so operated as to merely pass the signal therethrough without any substantial change. Thus, the output signal of the attenuator 20 is outputted without any change.

However, when noise in the received signal increases, the signal from the noise detection circuit 21, 22 and 23 increases to a HIGH level signal corresponding to the detected noise. When the output from the noise detection circuit 21, 22 and 23 increases, the controllable low pass filter 54 is gradually activated to cut off the high frequency signal components which are mostly occupied by the high frequency noise signals. Thus, as the output level from the noise detection circuit 21, 22 and 23 increases, the degree of cutting the high frequency component becomes greater.

Instead of the noise detection circuit 21, 22 and 23, it is possible to employ an electric field strength detection circuit for detecting the electric field strength of the received signal, such a level detector for detecting the FM IF signal level.

Figure 11:
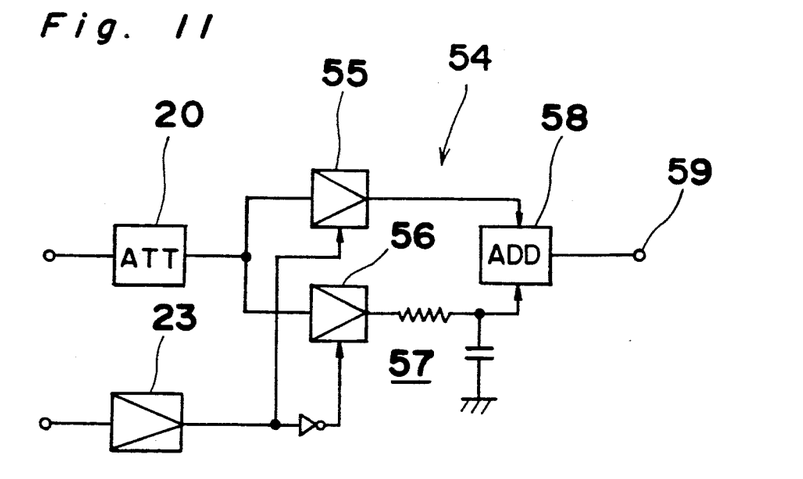
FIG. 11 is a circuit diagram of the low pass filter 54 shown in FIG. 10.

Referring to FIG. 11, an example of the controllable low pass filter 54 is shown, which comprises a first and second amplifier 55 and 56 for amplifying the output signal from attenuator 20, a low pass filter 57 for cutting off the high frequency signal from the output signal of the second amplifier 56, and an adder 58 for adding the output from the first amplifier 55 and the low pass filter 57. The gain of each of the first and second amplifiers 55 and 56 are controlled linearly with respect to the output level of the buffer amplifier 23.

In operation, when there is little or no noise signal in the received signal, the noise detection circuit 21, 22 and 23 produces a LOW level signal. Thus, the gain of the first amplifiers 55 and 56 are set, respectively, to the maximum and minimum levels. Thus, the output signal from attenuator 20 is transmitted through the first amplifier 55 and adder 58 and to output terminal 59. In this case, no filtering is effected in low pass filter 57 and, therefore, the output signal from attenuator 20 is outputted from the output terminal 59 with no substantial change.

When noise signal in the received signal increases, the signal from buffer amplifier 23 increases corresponding to the detected noise. Thus, the gain of the first amplifier 55 gradually decreases, and at the same time, the gain of the second amplifier 56 gradually increases. The output from the second amplifier 56 is applied to the low pass filter 57 in which the high frequency component is cut off. Thus, at the adder 58, the stereo difference signal of entire frequency range and the stereo difference signal with high frequency signal component being removed are added and the combined signal is outputted from terminal 59.

When noise signal in the received signal becomes very high, the signal from buffer amplifier 23 becomes maximum. Accordingly, the gain of the first amplifiers 55 and 56 are set, respectively, to the minimum and maximum levels. Thus, the output signal from attenuator 20 is transmitted through the second amplifier 56, low pass filter 57 and adder 58 and to output terminal 59. In this case, output terminal 59 produces the stereo difference signal with the high frequency signal component being cut off with the maximum rate.

It is to be noted that in any of the embodiments described above, the stereo sum signal (L+R) and the stereo difference signal (L−R) output from the stereo multiplexer 7 are considered to be included in the output signal of the FM signal detector 6, but the stereo sum signal (L+R) and the stereo difference signal (L−R) may also be generated by adding and subtracting the separated left and right stereo signals (L) and (R).

Furthermore, in any of the embodiments described above, a level control circuit is used in which four output signals are produced from the stereo multiplexer 7, and each signal is separately applied to an attenuation circuit for the level control, but other arrangement for the level control can be used. For example, it is possible to employ such an arrangement that the level control processing is first applied to the left and right stereo signals (L) and (R), and these level-controlled left and right stereo signals (L) and (R) are used to produce the stereo sum and difference signals (L+R) and (L−R).

As will be known to those skilled in the art from the preceding description of an FM stereo receiver according to the present invention, because directional emphasis based on the condition of the received signal is possible, an apparent improvement in separation can be achieved, and it is therefore possible to increase audio presence. Specifically, because noise included in the received signal is detected, erroneous directional emphasis caused by noise can be prevented, and correct directional emphasis can be applied.

According to the present invention, the detected noise signal is used to control the pro-logic surround system such that the dynamic range of at least the second comparison circuit is changed when the noise increases, or that the output signal level of at least the second comparison circuit is held when the noise increases, or that the level of at least the dominant difference signal is controlled using the second level control circuit when the noise increases.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An FM stereo receiver for receiving FM stereo broadcast signals, comprising:

means for generating from said FM stereo broadcast signals a left stereo signal, a right stereo signal, a stereo sum signal and a stereo difference signal;

first comparison means for generating a first control signal based on a ratio between the left stereo signal and the right stereo signal;

second comparison means for generating a second control signal based on a ratio between the stereo sum signal and the stereo difference signal;

direction control means for generating first, second, third and fourth direction control signals based on said first and second control signals;

level control means for controlling the level of each of said left stereo signal, right stereo signal, stereo sum signal and stereo difference signal in accordance with said first, second, third and fourth direction control signals, respectively;

noise signal detection means for producing a noise level signal representing a level of noise signal detected in said FM stereo broadcast signals; and changing means for changing a dynamic range of said second comparison means in accordance with said noise level signal.

2. An FM stereo receiver as claimed in claim 1, wherein said level control means suppresses the level of all but leaving at least one of said left stereo signal, a right stereo signal, a stereo sum signal and a stereo difference signal whereby emphasizing the sound corresponding to the signal which has not been suppressed.

3. An FM stereo receiver as claimed in claim 1, wherein said second comparison means comprises:

first and second transistors connected differentially;

current source means for supplying a collector current to said first and second transistors; and feedback means for feeding the first and second transistor collector output signal back to the base of one of said first and second transistors, whereby controlling the current source by said noise level signal to change the dynamic range of said second comparison means.

4. An FM stereo receiver as claimed in claim 1, wherein said changing means further changes a dynamic range of said first comparison means in accordance with said noise level signal.

5. An FM stereo receiver for receiving FM stereo broadcast signals, comprising:

means for generating from said FM stereo broadcast signals a left stereo signal, a right stereo signal, a stereo sum signal and a stereo difference signal;

first comparison means for generating a first control signal based on a ratio between the left stereo signal and the right stereo signal;

first separator means for separating said first control signal into a dominant left signal and a dominant right signal;

second comparison means for generating a second control signal based on a ratio between the stereo sum signal and the stereo difference signal;

second separator means for separating said second control signal into a dominant sum signal and a dominant difference signal;

direction control means for generating first, second, third and fourth direction control signals based on said dominant left signal, dominant right signal, dominant sum signal and dominant difference signal;

first level control means for controlling the level of each of said left stereo signal, right stereo signal, stereo sum signal and stereo difference signal in accordance with said first, second, third and fourth direction control signals, respectively;

noise signal detection means for producing a noise level signal representing a level of noise signal detected in said FM stereo broadcast signals; and second level control means for changing the level of said dominant difference signal based on said noise level signal.

6. An FM stereo receiver as claimed in claim 5, wherein said first level control means suppresses the level of all but leaving at least one of said left stereo signal, a right stereo signal, a stereo sum signal and a stereo difference signal whereby emphasizing the sound corresponding to the signal which has not been suppressed.

7. An FM stereo receiver as claimed in claim 5, wherein said second level control means further changes the level of said dominant left signal, said dominant right signal and said dominant sum signal based on said noise level signal.

8. An FM stereo receiver as claimed in claim 5, wherein said second level control means comprises a dividing resistor and means for changing the current flowing through said dividing resistor in accordance with said noise level signal.

9. An FM stereo receiver as claimed in claim 5, wherein said second level control means comprises a switch and means for controlling said switch in accordance with said noise level signal.

10. An FM stereo receiver for receiving FM stereo broadcast signals, comprising:

means for generating from said FM stereo broadcast signals a left stereo signal, a right stereo signal, a stereo sum signal and a stereo difference signal;

first comparison means for generating a first control signal based on a ratio between the left stereo signal and the right stereo signal;

second comparison means for generating a second control signal based on a ratio between the stereo sum signal and the stereo difference signal;

direction control means for generating first, second, third and fourth direction control signals based on said first and second control signals;

level control means for controlling the level of each of said left stereo signal, right stereo signal, stereo sum signal and stereo difference signal in accordance with said first, second, third and fourth direction control signals, respectively;

noise signal detection means for producing a noise level signal representing a level of noise signal detected in said FM stereo broadcast signals; and first holding means for holding an output signal of said second comparison means in accordance with said noise level signal.

11. An FM stereo receiver as claimed in claim 10, wherein said level control means suppresses the level of all but leaving at least one of said left stereo signal, a right stereo signal, a stereo sum signal and a stereo difference signal whereby emphasizing the sound corresponding to the signal which has not been suppressed.

12. An FM stereo receiver as claimed in claim 10, further comprising a second holding means for holding an output signal of said first comparison means in accordance with said noise level signal.

13. An FM stereo receiver according to claim 10, wherein said first holding means comprises a gate means which operates in accordance with said noise level signal and a capacitor for holding the signal from said second comparison means immediately before said gate circuit closes.

* * * * *